United States Patent
Lee et al.

(10) Patent No.: US 7,330,422 B2
(45) Date of Patent: Feb. 12, 2008

(54) OPTICAL STORAGE MEDIUM HAVING TEST PATTERN FOR MEASURING A MODULATION DEGREE DURING RECORDING PROCESS

(75) Inventors: Kyung-geun Lee, Seongnam-si (KR); Jae-seong Shim, Seoul (KR); Jung-wan Ko, Suwon-si (KR); In-sik Park, Suwon-si (KR); Myong-do Ro, Suwon-si (KR); Jin-han Kim, Suwon-si (KR); Chang-min Park, Suwon-si (KR); In-oh Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 674 days.

(21) Appl. No.: 10/678,633

(22) Filed: Oct. 6, 2003

(65) Prior Publication Data
US 2004/0136302 A1 Jul. 15, 2004

(30) Foreign Application Priority Data

| Oct. 5, 2002 | (KR) | 10-2002-0060819 |
| Oct. 18, 2002 | (KR) | 10-2002-0063889 |
| Jul. 4, 2003 | (KR) | 10-2003-0045385 |

(51) Int. Cl.
*G11B 7/24* (2006.01)

(52) U.S. Cl. ............................................... 369/275.3
(58) Field of Classification Search .................. None
See application file for complete search history.

(56) References Cited

U.S. PATENT DOCUMENTS

| 6,577,571 | B2 * | 6/2003 | Takeda et al. | 369/47.53 |
| 6,700,843 | B1 * | 3/2004 | Kuroda | 369/47.1 |
| 6,862,256 | B2 * | 3/2005 | Lee et al. | 369/53.15 |
| 7,142,495 | B2 * | 11/2006 | Lee et al. | 369/53.21 |
| 2001/0033517 | A1 | 10/2001 | Ando et al. | |
| 2002/0041550 | A1 | 4/2002 | Coene et al. | |
| 2002/0080706 | A1 | 6/2002 | Fujimiya | |
| 2003/0048727 | A1 | 3/2003 | Ando et al. | |
| 2003/0133376 | A1 | 7/2003 | Matsumoto | |
| 2003/0227846 | A1 * | 12/2003 | Lee et al. | 369/53.21 |
| 2004/0125738 | A1 * | 7/2004 | Lee et al. | 369/275.3 |
| 2005/0207262 | A1 * | 9/2005 | Terada et al. | 369/53.2 |
| 2005/0219979 | A1 * | 10/2005 | Terada et al. | 369/53.16 |
| 2006/0007847 | A1 * | 1/2006 | Lee | 369/275.3 |
| 2006/0072408 | A1 * | 4/2006 | Chiu et al. | 369/47.51 |

* cited by examiner

*Primary Examiner*—Tan Dinh
(74) *Attorney, Agent, or Firm*—Stein, McEwen & Bui, LLP (57) ABSTRACT

A read-only information storage medium includes: a data area which stores user data; a lead-in area; and a lead-out area. A pattern for achieving a purpose is formed in at least one of the lead-in area and the lead-out area.

17 Claims, 7 Drawing Sheets

FIG. 1 (PRIOR ART)

| | DESCRIPTION | OBJECT |
|---|---|---|
| LEAD-IN AREA | CONTROL DATA ZONE | DISC-RELATED INFORMATION & COPY PROTECTION INFORMATION |
| | BUFFER ZONE | — |
| | RESERVED ZONE | NEW DATA TO BE ADDED LATER |
| | INFORMATION ZONE | INFORMATION REGARDING DISC STATE OR DRIVE STATE |

2T SIGNAL

FIG. 3

| | DESCRIPTION | OBJECT |
|---|---|---|
| LEAD-IN AREA | CONTROL DATA ZONE | DISC-RELATED INFORMATION & COPY PROTECTION INFORMATION |
| | BUFFER ZONE | --- |
| | RESERVED ZONE | NEW DATA TO BE ADDED LATER |
| | TEST ZONE | MEASUREMENT OF MODULATION DEGREE |
| | INFORMATION ZONE | INFORMATION REGARDING DISC STATE OR DRIVE STATE |
| DATA AREA | --- | --- |

OPTICAL STORAGE MEDIUM HAVING TEST PATTERN FOR MEASURING A MODULATION DEGREE DURING RECORDING PROCESS

CROSS-REFERENCE TO RELATED APPLICATIONS

This application claims the priorities of Korean Patent Applications Nos. 2002-60819, 2002-63889, and 2003-45385, filed on Oct. 5, 2002, Oct. 18, 2002, and Jul. 4, 2003, respectively, in the Korean Intellectual Property Office, the disclosures of which are incorporated herein in their entirety by reference.

BACKGROUND OF THE INVENTION

1. Field of the Invention

The present invention relates to a high-density read-only optical information storage medium in which a pattern necessary for data reproduction is formed in a lead-in area and/or a lead-out area, thus improving reproduction characteristics, and a method of reproducing data from such a high-density read-only optical information storage medium.

2. Description of the Related Art

Generally, information storage media such as, for example, optical disks, are widely used in optical pickup apparatuses for recording/reproducing information in a non-contact way. Optical disks are classified as compact disks (CDs) or digital versatile disks (DVDs) according to their information storage capacity. Examples of recordable optical disks include 650 MB CD–R, CD–RW, 4.7 GB DVD+RW, DVD–RAM (random access memory), and DVD–R/RW (rewritable). Furthermore, HD-DVDs having a recording capacity of 20 GB or greater are under development.

As the capacity of information storage media increases as described above, the length and width of a pit recorded on read-only information storage media decrease. With such a reduction of the pit length and pit width, a signal for a minimum mark becomes very small, which makes it more difficult to measure a modulation degree. The modulation degree measurement is needed to measure the recording and/or reproduction performance of a data signal. For example, the degree of modulation based on a run-length-limited RLL (d, k) modulation technique is I(d+1)/I(k+1), wherein I denotes the intensity of a signal in an eye pattern. The eye pattern is a graph showing the characteristics of a data signal.

In a run-length-limited (RLL) modulation technique, modulation is performed based on how many bits of a value 0 exist between two bits of a value 1. RLL (d,k) represents that the minimum and maximum numbers of bits of 0 between two bits of 1 are d and k, respectively. For example, RLL (1,7) represents that the minimum and maximum numbers of bits of 0 between two bits of 1 are 1 and 7, respectively. In an RLL (1,7) modulation technique, if one bit of 0 exists between two bits of 1, data "1010101" is recorded. Hence, a length between two bits of 1 is 2T. If 7 bits of 0 exist between two bits of 1, data "10000000100000001" is recorded, and accordingly, a length between two bits of 1 is 8T. Here, T denotes the length of a minimum mark, that is, a minimum pit. Hence, in the RLL (1,7) modulation technique, data is recorded in the form of pits and spaces that range in length between 2T and 8T.

In an RLL (2,10) modulation technique, data is recorded in the form of pits and spaces that range in length between 3T and 11T.

In the RLL (1,7) modulation technique, a modulation degree is measured as $I_2/I_8$. In the RLL (2,10) modulation method, a modulation degree is measured as $I_3/I_{11}$.

Figure 1:
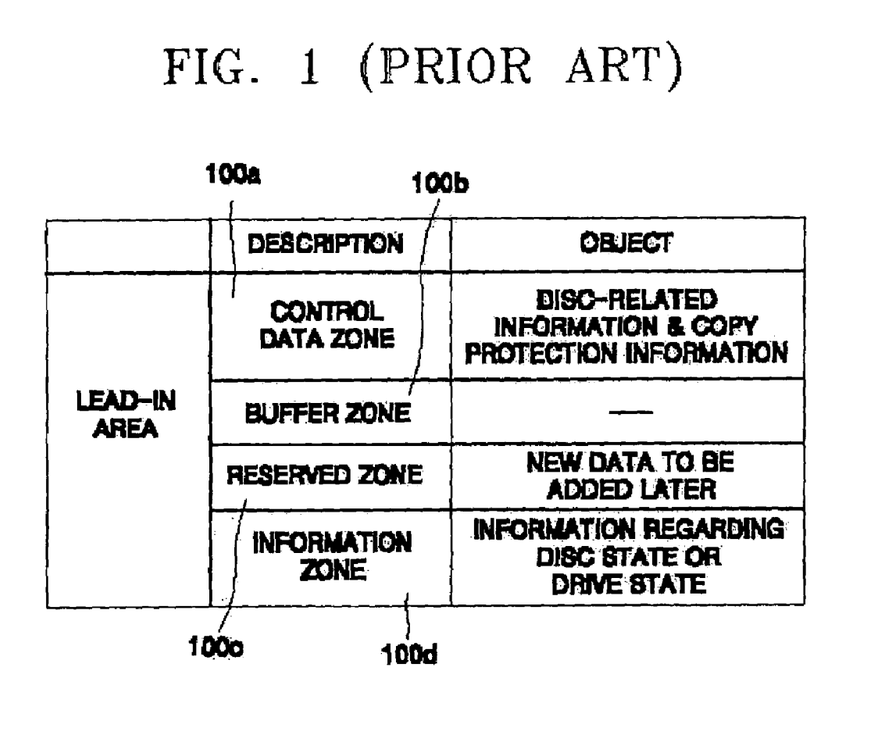
FIG. 1 shows a structure of a lead-in area of a conventional read-only information storage medium.

FIG. 1 shows a structure of a lead-in area of a conventional read-only information storage medium. The lead-in area includes a control data zone 100a, a buffer zone 100b, and information zone 100d. The control data zone 100a stores disc-related information and copy protection information. The information zone 100d stores information regarding the state of a driver or disc. The lead-in area further includes a reserved zone 100c to store data that has not yet been determined but is added later.

As shown in FIG. 1, the conventional read-only information storage medium does not include an area used to measure a modulation degree. Accordingly, a measurer must measure a modulation degree directly from the eye pattern of data recorded in a user data area.

Figure 2:
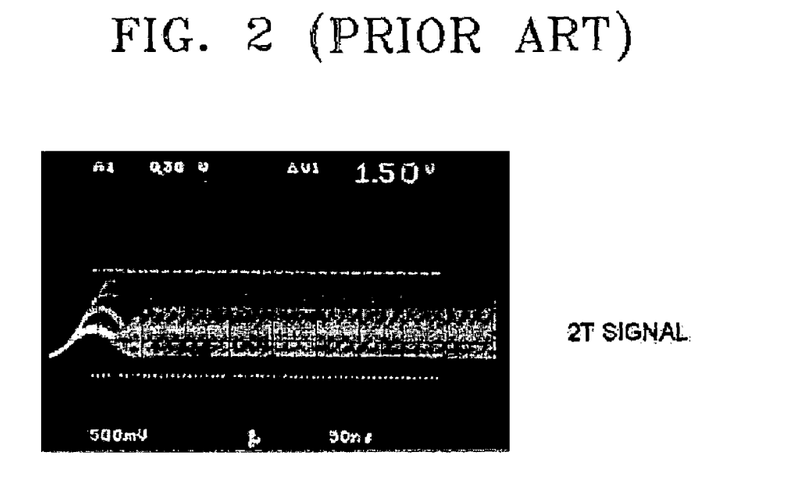
FIG. 2 shows an eye pattern of a signal obtained by reproducing data recorded according to an RLL (1,7) modulation method.

FIG. 2 shows an eye pattern for a random signal during data recording based on the RLL (1,7) modulation technique. In FIG. 2, the horizontal axis denotes the time, and the vertical axis denotes the intensity (I) of a signal. In the related art, when a modulation degree is measured using such an eye pattern as shown in FIG. 2, a measurer moves the cursor of an oscilloscope to a crest of the wave of a signal pattern corresponding to a 2T-long minimum pit in order to measure $I_2$, and also moves the cursor of the oscilloscope to a crest of the wave of a signal pattern corresponding to an 8T-long maximum pit in order to measure $I_8$, thereby measuring a modulation degree of $I_2/I_8$.

However, with an increase in the recording capacity of information storage media, the length and width of a minimum pit decrease, and hence, the eye pattern of the minimum pit becomes smaller and, in turn, more difficult to accurately measure. Thus, in such a conventional modulation degree measuring technique, different measurers may output different measurement results, thus increasing an error. In other words, as the amplitude of an eye pattern decreases, measurers are increasingly likely to move an oscilloscope cursor to different locations on a crest of the wave of a signal pattern corresponding to the length of a minimum pit. Thus, the accuracy of a measured modulation degree is degraded. This problem becomes more serious as the capacity of information storage media increases. Also, as the length of a space between adjacent pits decreases, serious cross-talk occurs, which impedes an accurate measurement of a modulation degree.

The above-described modulation degree measurement is necessary upon data reproduction. A system adaptation process is also necessary upon data reproduction. These requisites for data reproduction must be satisfied to achieve smooth data reproduction.

SUMMARY OF THE INVENTION

The present invention provides a read-only information storage medium in which a pattern for achieving a purpose necessary for data reproduction is formed in at least one of a lead-in area and a lead-out area, and reproduction characteristics are improved by using the pattern, and a method of reproducing data from the read-only information storage medium.

Additional aspects and/or advantages of the invention will be set forth in part in the description which follows and, in part, will be obvious from the description, or may be learned by practice of the invention.

According to an aspect of the present invention, there is provided a read-only information storage medium including a user data area, which stores user data, a lead-in area, and a lead-out area. A pattern for achieving a purpose is formed in at least one of the lead-in area and the lead-out area.

The pattern may be a test pattern for measuring a modulation degree when data is recorded using a data recording modulation technique.

The test pattern may be recorded in such a way that at least one minimum pit and one maximum pit among pits produced by the data recording modulation technique are recorded in one period.

The test pattern may include a pit with a length different from the lengths of the minimum and maximum pits.

The test pattern may include a minimum pit and a maximum pit among the pits produced by the data recording modulation technique which alternate in each recording unit.

The test pattern may include first and second patterns which alternate in each recording unit. The first pattern may include minimum pits and pits with lengths different from the minimum pits among the pits produced by the data recording modulation technique, and the second pattern may include maximum pits and pits with lengths different from the maximum pits among the pits produced by the data recording modulation technique.

In the reproduction of the test pattern, tracking may be performed using a differential phase detection (DPD) method or a push-pull method.

The data recording modulation technique may be an RLL (d,k) modulation technique.

The test pattern may yield a DC sum of a signal characteristic graph of 0.

The test pattern may include a first data pattern of (d+1)T pits and a second data pattern of (k+1)T pits.

The overall length of the first and second data patterns may be a 2n (n is a natural number) multiple of the least common multiple of (d+1) and (k+1).

The purpose of the use of the pattern may be data reproduction.

The pattern for a purpose may be a pattern for asymmetry measurement.

A test zone may be included in at least one of the lead-in area and the lead-out area, and the pattern for a purpose is formed in the test zone.

According to another aspect of the present invention, there is provided a read-only information storage medium including a data area, which stores user data, a lead-in area, and a lead-out area. A pattern for partial response maximum likelihood (PRML) adaptation is formed in at least one of the lead-in area and the lead-out area.

The pattern for PRML adaptation may vary depending on the target channels of a PRML system and the value of d of an RLL (d, k) code.

The pattern for PRML adaptation may include signals with lengths of at least one of 2T, 3T length, and a range from 5T to (k+1)T, when a PRML (a, b, b, b, a) system and an RLL (d, k) code (where d is 1) are used for data reproduction.

The pattern for PRML adaptation may include signals with lengths of at least one of 3T and a range from 5T to (k+1)T, when a PRML (1, 2, 2, 2, 1) system and the RLL (d, k) code (where d is 1) are used for data reproduction.

The pattern for adaptation may be a pattern of 2T/2T/4T/4T when the PRML (a, b, b, a) system and the RLL (d, k) code (where d is 1) are used for data reproduction.

The pattern for PRML adaptation may be a pattern of signals each having a 3T length, when a PRML (a, b, a) system and the RLL (d, k) code (where d is 1) are used for data reproduction.

The pattern for PRML adaptation may include at least one of signals with lengths that range from 2T to (k+1)T, when a PRML system and an RLL (d, k) code are used for data reproduction.

According to another aspect of the present invention, there is provided a method of reproducing data from a read-only information storage medium which includes a user data area for storing user data, a lead-in area, and a lead-out area. The method includes forming a pattern for achieving one of a test and an adaptation operation, both of which are necessary for data reproduction, in at least one of the lead-in area and the lead-out area, performing one of a test and an adaptation operation using the pattern, and reproducing the data. The pattern is one of a test pattern and an adaptation pattern, wherein, when the performing is performing a test operation, the pattern is the test pattern, and wherein, when the performing is an adaptation operation, the pattern is the adaptation pattern.

The test-performing step may include tracking the test pattern, and measuring a modulation degree by using a signal characteristic graph for the test pattern.

According to yet another aspect of the present invention, there is provided a method of reproducing data from a read-only information storage medium which includes a data area for storing data, a lead-in area, a lead-out area, and a pattern for achieving a purpose necessary for data reproduction formed in at least one of the lead-in area and the lead-out area. The method includes: performing one of a test operation and an adaptation operation using the pattern; and reproducing the data. The pattern is one of a test pattern and an adaptation pattern, wherein, when the performing is performing a test operation, the pattern is the test pattern, and wherein, when the performing is an adaptation operation, the pattern is the adaptation pattern.

According to still another aspect of the present invention, there is provided a method of measuring a modulation degree representing performance of data recording and/or reproduction. The method includes: reading a pattern having a removable DC component and generating a data signal in response thereto; removing the DC component of the pattern; and measuring the modulation degree of the data signal using a signal characteristic graph. The pattern is formed in at least one of a lead-in area and a lead-out area of a read-only information storage medium.

According to yet another aspect of the present invention, there is provided a method of optimizing data reproduction characteristics. The method includes reading a pattern formed a read-only information storage medium including a data area which stores data, a lead-in area, and a lead-out area, the pattern formed in at least one of the lead-in area and the lead-out area. The pattern is at least one of a pattern for modulation degree measurement, a partial response maximum likelihood (PRML) adaptation pattern, and a pattern for asymmetry measurement.

BRIEF DESCRIPTION OF THE DRAWINGS

These and other aspects and advantages of the invention will become apparent and more readily appreciated from the following description of the preferred embodiments, taken in conjunction with the accompanying drawings of which.

DETAILED DESCRIPTION OF PREFERRED EMBODIMENT

Reference will now be made in detail to an embodiment of the present invention, an example of which is illustrated in the accompanying drawings, wherein like reference numerals refer to the like elements throughout. The embodiment is described below in order to explain the present invention by referring to the figures.

Figure 3:
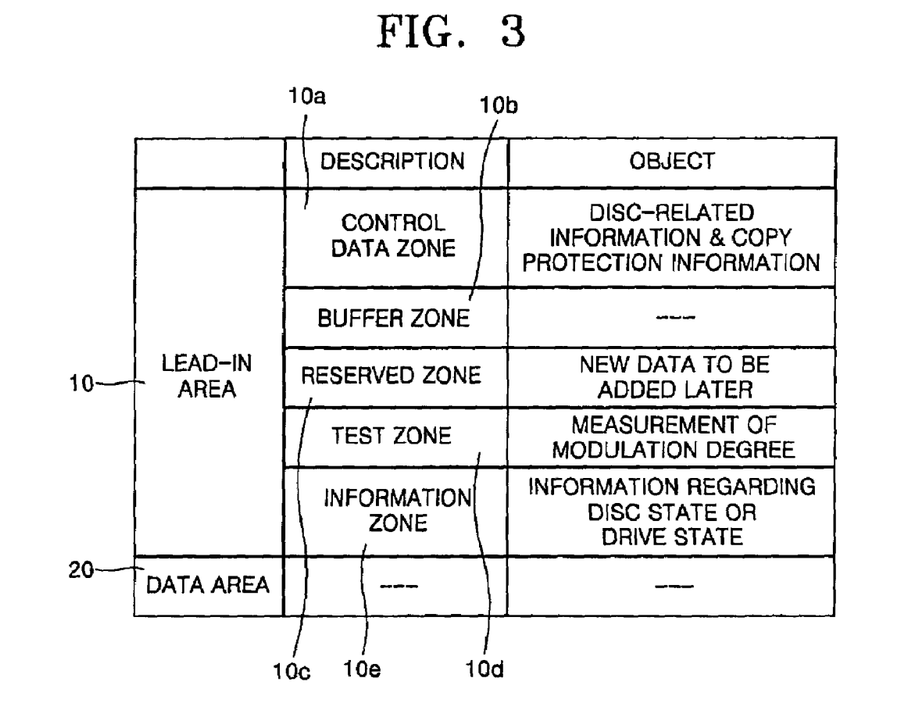
FIG. 3 schematically shows a data structure of a read-only information storage medium according to an embodiment of the present invention.

Referring to FIG. 3, a read-only information storage medium according to the an embodiment of the present invention includes a user data area 20 which stores user data, a lead-in area 10 which is formed at the inner boundary of the user data area 20 to store disc-related information, and a lead-out area (not shown), which is formed at the outer boundary of the user data area.

In the read-only information storage medium according to the present embodiment of the present invention, a pattern for achieving a purpose is formed in at least one of the lead-in area 10 and the lead-out area.

The purpose of the pattern is to reproduce data from an information storage medium. For example, the pattern may be a pattern for at least one of a modulation degree measurement, an asymmetry measurement, and a Partial Response Maximum Likelihood (PRML) adaptation. The pattern is formed in a portion of at least one of the lead-in area 10 and the lead-out area. And, the pattern is formable in a test zone 10d of the lead-in area 10. Further, the test zone 10d is also includable in the lead-out area. The pattern is formable in both the lead-in area 10 and the lead-out area in order to improve reliability.

The lead-in area 10 includes a control data zone 10a which stores disc-related information and copy protection information, a buffer zone 10b, a reserved zone 10c, and an information zone 10e which stores information regarding the state of a drive or disc. Examples of the disc-related information include information regarding the types of storage media, such as a recordable disc, a write-once disc, and a read-only disc, information regarding the number of recording layers, information regarding a recording speed, information regarding the size of a disc, and the like.

For example, a pit pattern for measuring a modulation degree is formable in the test zone 10d. A method of measuring the modulation degree of data that has been recorded according to an RLL (d,k) modulation method will now be described in detail.

As described above, the RLL (d, k) modulation method is based on the definition that the minimum and maximum numbers of bits of 0 between two bits of 1 are d and k, respectively. In this case, a pattern including a minimum pit and a maximum pit at least within a period (P) is formed in the test zone 10d. For example, in an RLL (1, 7) modulation method, data is recorded in the form of pits and spaces that range in length between 2T and 8T. Hence, a pattern including at least one 2T pit and one 8T pit within a period (P) is formed in the test zone 10d. Here, T denotes the length of a minimum mark.

Figure 4A:
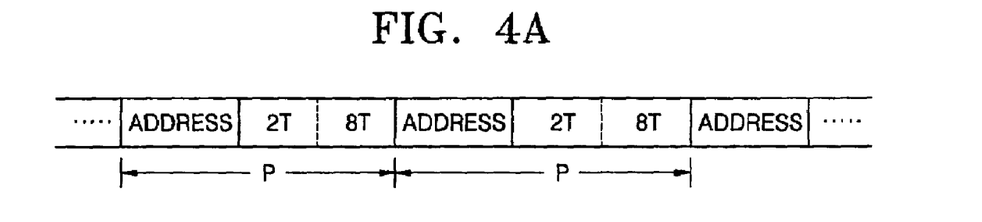
FIGS. 4A through 4D show examples of a pattern for modulation degree measurement, the pattern recorded in a test zone included in a read-only information storage medium of FIG. 3.

To be more specific, as shown in FIG. 4A, a pattern including a 2T pit and an 8T pit within one period (P) is formed in the test zone 10d. In this case, the period (P) is a recording unit, such as, an error correction code (ECC) block, a sector, and a frame. An address is recorded at the head of each recording unit.

Figure 4B:
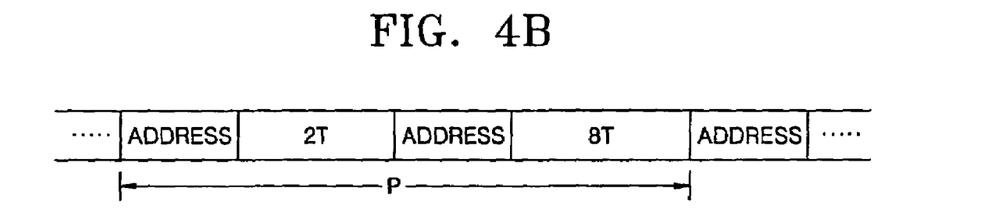

Alternatively, consecutive 2T pits are arranged at the front half of a recording unit, and consecutive 8T pits are arranged at the rear half thereof. Also, a 2T pit and an 8T pit may alternate, like 2T/8T/2T/8T/2T/8T, or a pattern of 2T/2T/8T/2T/2T/8T is formable. In other words, 2T and 8T pits are combinable in various ways to form a pattern. Meanwhile, one period comprises of two recording units as shown in FIG. 4B. In FIG. 4B, a minimum pit of 2T is recorded in one of the two recording units, and a maximum pit of 8T is recorded in the other recording unit. In other words, if a pattern of minimum pits is recorded in one recording unit, a pattern of maximum pits is recorded in the next recording unit.

Figure 4C:
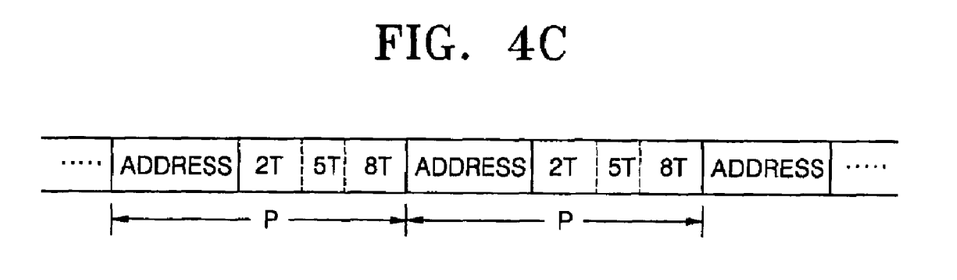

Alternatively, a pattern of a minimum pit, a maximum pit, and a pit with a length different from the minimum and maximum pits is formable within one period (P). The pit different from the minimum and maximum pits has a middle length between the lengths of the minimum and maximum pits. For example, as shown in FIG. 4C, a pattern of 2T, 5T, and 8T pits is recorded within one period (P). In this case, as in the example of FIG. 4A, the period (P) is a recording unit, such as, an ECC block, a sector, or a frame.

Figure 4D:
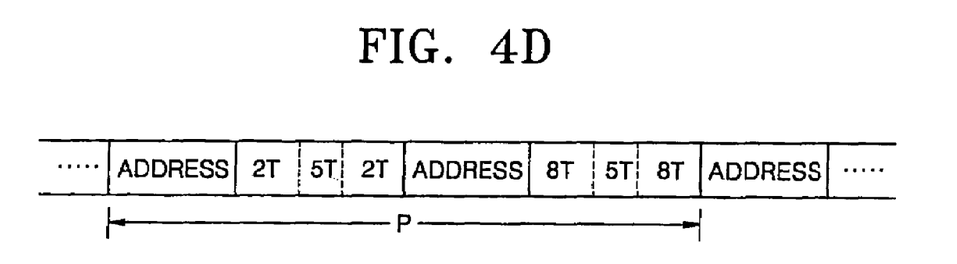

As shown in FIG. 4D, the pattern for modulation degree measurement (hereinafter, referred to as a test pattern) is also formable by alternating a first pattern, which includes minimum pits and a pit with a length different to the minimum pits, and a second pattern, which includes maximum pits and a pit with a wavelength different to the maximum pits. Each of the first and second patterns is recorded in each recording unit. In this case, the period (P) is comprised of two recording units. Each of the recording units may be an error correction code (ECC) block, a sector, or a frame. Accordingly, the first pattern is recordable in an n-th ECC block, and the second pattern is recordable in an (n+1)th ECC block. For example, as shown in FIG. 4D, a first pattern of two 2T pits and a 5T pit and a second pattern of two 8T pits and a 5T pit are recorded within a period (P).

The test pattern recorded in the test zone 10d is configured so that a DC sum becomes 0, thus increasing the reliability of signal reproduction.

As described above, the test pattern including a minimum pit and a maximum pit is at least periodically recorded in the test zone 10d, and a modulation degree is easily measurable by using a signal for the test pattern. The test zone 10d which stores the test pattern is includable in a lead-out area as well as in a lead-in area in order to measure the reproduction performance of both the inner and outer boundaries. Since the structure of the lead-out area is similar to that of the lead-in area, it will not be described in detail.

Instead of the test pattern, a pattern for adaptation to a partial response maximum likelihood (PRML) (hereinafter, referred to as a PRML adaptation pattern) is formable in the test zone 10d. In a PRML detection technique, an input signal is first pre-decoded so that current and previous data have an intersymbol-interference, and then the pre-coded input signal is modulated into a target response. The value of the target response is decoded into data by a viterbi decoder. According to the PRML detection technique, channel characteristics (e.g., distortion) are compensated by equalization, and error correction due to jitter is achieved using a viterbi decoder.

When an RLL (d, k) code is used in the PRML detection technique, the PRML adaptation pattern varies depending on the target channels of a PRML system and the value of "d" in the RLL (d, k) code. For example, in a PRML (a, b, b, b, a) system, the values in the bracket denote target channels. An PRML adaptation pattern represents all expected values that are obtainable from the target channels of a PRML system and is formed of at least one selected from signals with lengths that range from (d+1)T to (k+1)T. An PRML adaptation pattern is formed of signals with minimum lengths selected from signals with lengths in the range of (d+1)T to (k+1)T if possible.

Figure 5A:
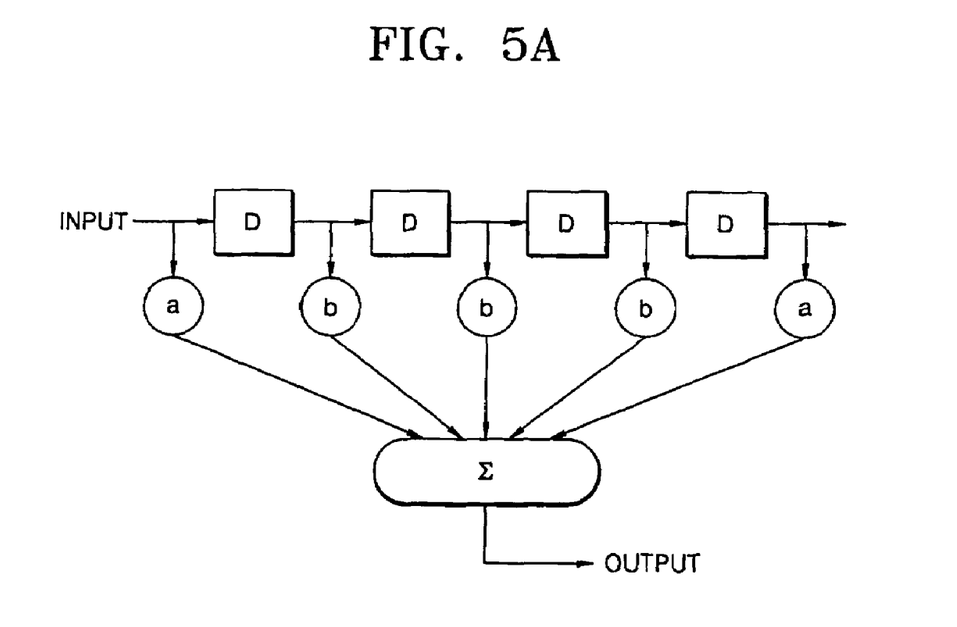
FIGS. 5A through 5C show equalizers used to obtain expected values of a partial response maximum likelihood (PRML) system which is used in a read-only information storage medium of FIG. 3.

FIG. 5A shows an equalizer used to obtain expected values that are representable in the case where an RLL (d, k) code (where d is 1) and a PRML (a, b, b, b, a) system are used in a read-only information storage medium according to the present invention. The obtained expected values are shown in the following Table 1.

| Input | Output (expected values) | Input | Output (expected values) |
|---|---|---|---|
| 1 1 1 1 1 | 2a + 3b | −1 −1 −1 −1 −1 | −2a − 3b |
| 1 1 1 1 −1 | 3b | −1 −1 −1 −1 1 | −3b |
| 1 1 1 −1 −1 | b | −1 −1 −1 1 1 | −b |
| 1 1 −1 −1 | −b | −1 −1 1 1 1 | b |
| 1 1 −1 1 1 | 2a − b | −1 −1 1 1 −1 | −2a + b |
| 1 −1 −1 −1 | −3b | −1 1 1 1 1 | 3b |
| 1 −1 −1 −1 | 2a − 3b | −1 1 1 1 −1 | −2a + 3b |
| 1 −1 −1 1 1 | 2a − b | −1 1 1 −1 −1 | −2a + b |

As shown in Table 1, a total of 10 expected values are obtainable in the case where the RLL (d, k) code (where d is 1) and the PRML (a, b, b, b, a) system are used. In the case where the PRML (1, 2, 2, 2, 1) system is used, 9 expected values, which are +8, +6, +4, +2, 0, −2, −4, −6, and −8, are obtained. The 9 expected values are representable by a PRML adaptation pattern formed by repeating at least one selected from signals with a 2T length, a 3T length, and lengths in the range of 5T to (k+1)T. The PRML adaptation pattern includes signals with lengths of at least 2T, 3T, and 5T. When a repetitive pattern of 3T/2T/2T/3T/5T/5T or 2T/2T/3T/3T/5T/5T is recorded, the repetitive pattern is usable for the purpose of achieving adaptation to the PRML (1, 2, 2, 2, 1) system upon data reproduction. The PRML (1, 2, 2, 2, 1) system represents all of the 9 expected values using the repetitive pattern.

Figure 5B:
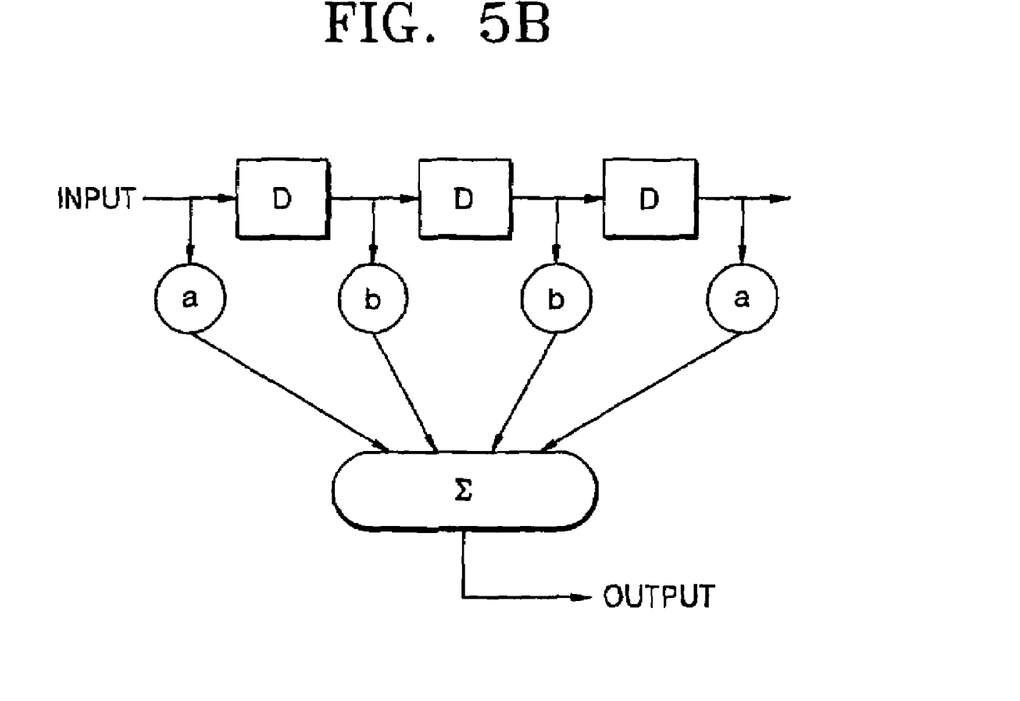

FIG. 5B shows an equalizer used to obtain expected values that are representable in the case where the RLL (d, k) code (where d is 1) and a PRML (a, b, b, a) system are used in a read-only information storage medium according to the present invention. The obtained expected values are shown in the following Table 2.

| Input | Output (expected values) | Input | Output (expected values) |
|---|---|---|---|
| 1 1 1 1 | 2a + 2b | −1 −1 −1 −1 | −2a − 2b |
| 1 1 1 −1 | 2b | −1 −1 −1 1 | −2b |
| 1 1 −1 −1 | 0 | −1 −1 1 1 | 0 |
| 1 −1 −1 −1 | −2b | −1 1 1 1 | 2b |
| 1 −1 −1 1 | 2a − 2b | −1 1 1 −1 | −2a + 2b |

As shown in Table 2, a total of 7 expected values are representable in the case where the RLL (d, k) code (where d is 1) and the PRML (a, b, b, a) system are used. In the case where a PRML (1, 2, 2, 1) system is used, 7 expected values, which are +6, +4, +2, 0, −2, −4, and −6, are obtained. The 7 expected values are representable by a PRML adaptation pattern that is formed of at least one selected from signals with a 2T length and lengths in the range of 4T to (k+1)T. When data is recorded in a repetitive pattern of 2T 2T 4T 4T, the repetitive pattern represents all of the 7 expected values obtained in the case where the PRML (1, 2, 2, 1) system and the RLL (1, k) code are used. Thus, the repetitive pattern is usable for the purpose of achieving adaptation to the RLL (d, k) code and the PRML (a, b, b, a) system upon data reproduction. In other words, all of the 7 expected values of +6, +4, +2, 0, −2, −4, and −6 are representable by a pattern including 2T and 4T pits.

Figure 5C:
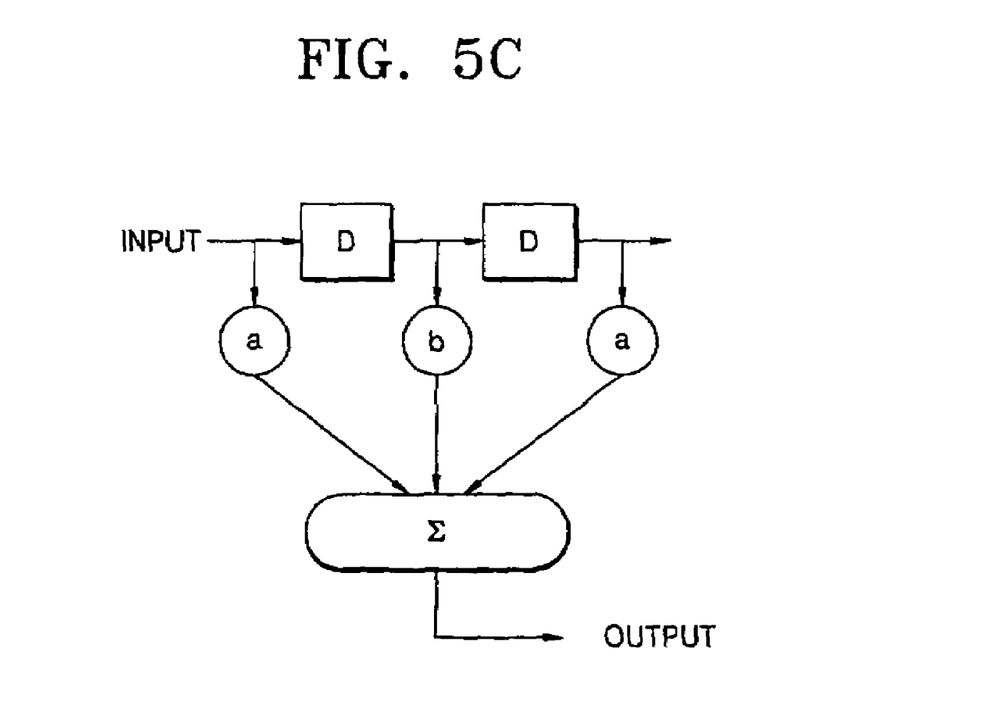

FIG. 5C shows an equalizer used to obtain expected values that are representable in the case where the RLL (d, k) code (where d is 1) and a PRML (a, b, a) system are used in a read-only information storage medium according to the present embodiment of the present invention. The obtained expected values are shown in the following Table 3.

| Input | Output (expected values) |
|---|---|
| 1 1 1 | 2a + b |
| 1 1 −1 | b |
| 1 −1 −1 | −b |
| −1 −1 −1 | −2a − b |
| −1 −1 1 | −b |
| −1 1 1 | b |

As shown in Table 3, a total of 4 expected values are representable in the case where the RLL (d, k) code (where d is 1) and the PRML (a, b a) system are used. The 4 expected values are representable by a PRML adaptation pattern that is formed of at least one selected from signals with lengths in the range of 3T to (k+1)T. The PRML adaptation pattern is usable for the purpose of achieving adaptation to the RLL (d, k) code and the PRML (a, b, a) system. In the case where a PRML (1, 2, 1) system and an RLL (1, k) code are used, 4 expected values, which are +4, +2, −2, and −4, are obtained. In this case, all of the 4 expected values are representable by a pattern of 3T pits.

The above-described PRML adaptation pattern is formable in at least one of the lead-in area 10 and the lead-out area (not shown). Further, the pattern is formed in the test zone 10d of the lead-in area 10.

The pattern for achieving a purpose, according to the present embodiment of the present invention, may be a pattern for asymmetry measurement. When an RLL (d, k) code is used, the pattern for asymmetry measurement includes a (d+1)T pit and a (k+1)T pit at least.

As described above, in the read-only information storage medium according to the present embodiment of the present invention, at least one of patterns for purposes, such as, modulation degree measurement, PRML adaptation, and asymmetry measurement, is formed in the test zone 10d to improve the reproduction characteristics of the information storage medium.

A method of reproducing data from a read-only information storage medium according to the present invention will now be described in detail.

As described above, a test zone is installed in at least one of a lead-in area and a lead-out area, and a pattern for a purpose is formed in the test zone. The pattern for a purpose is used upon data reproduction and, for example, includes at least one of a pattern for modulation degree measurement (i.e., a test pattern), a PRML adaptation pattern, and a pattern for asymmetry measurement.

The test pattern may be any of the patterns described above with reference to FIGS. 4A through 4D. Tracking is performed to measure a modulation degree using a test pattern formed of at least a minimum pit and a maximum pit selected from pits produced by the data recording modulation technique.

Tracking can be achieved according to a differential phase detection (DPD) method or a push-pull method. In the DPD method, a tracking servo is implemented using the phase difference of an optical spot that is focused on a photodetector, for example, a quadrant photodetector. In the push-pull method, a servo is implemented using the right-left signal difference of an optical spot that is focused on a photodetector. These methods are well known, so they will not be described in detail.

Figure 6A:
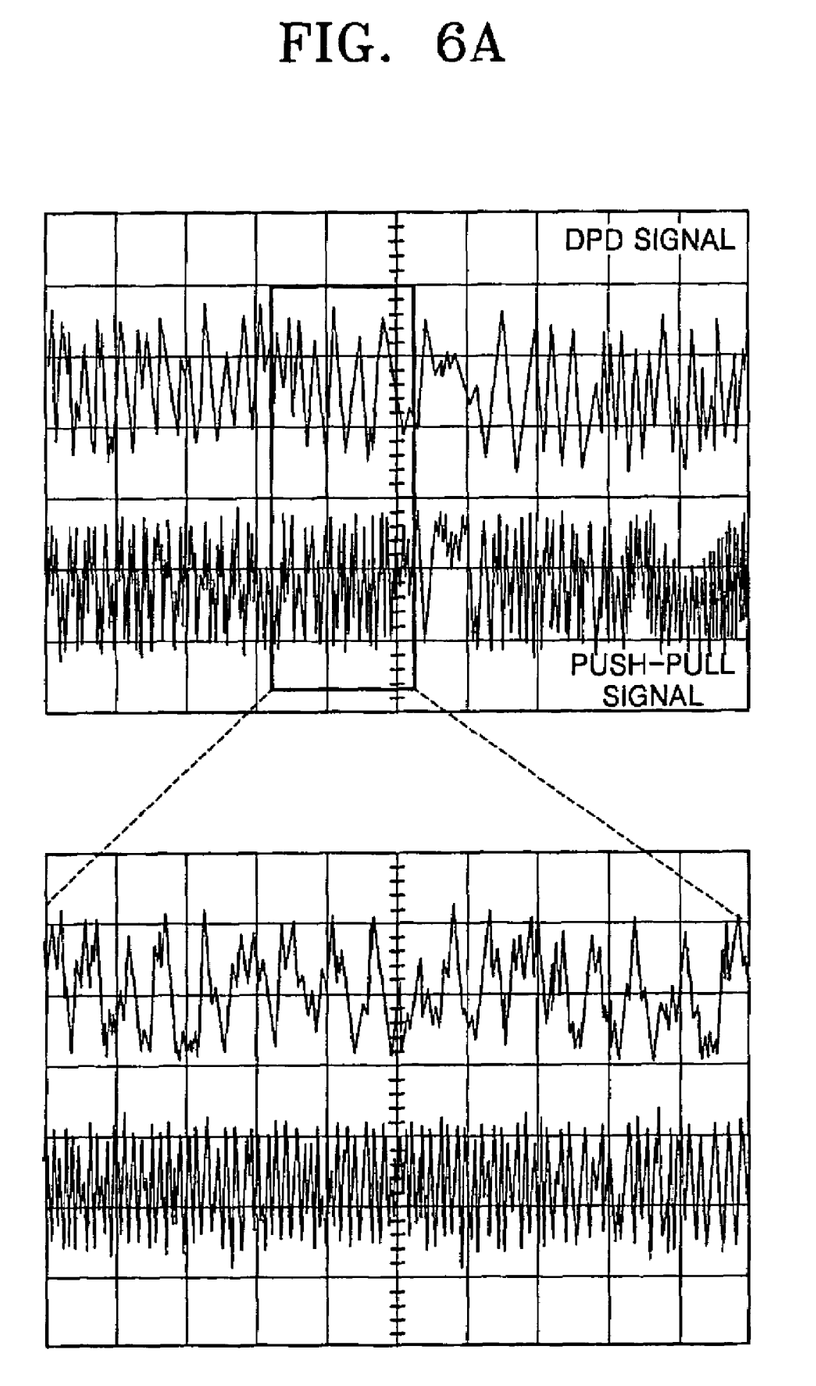
FIG. 6A shows a differential phase detection (DPD) signal for a single pattern and a push-pull signal for a single pattern.
Figure 6B:
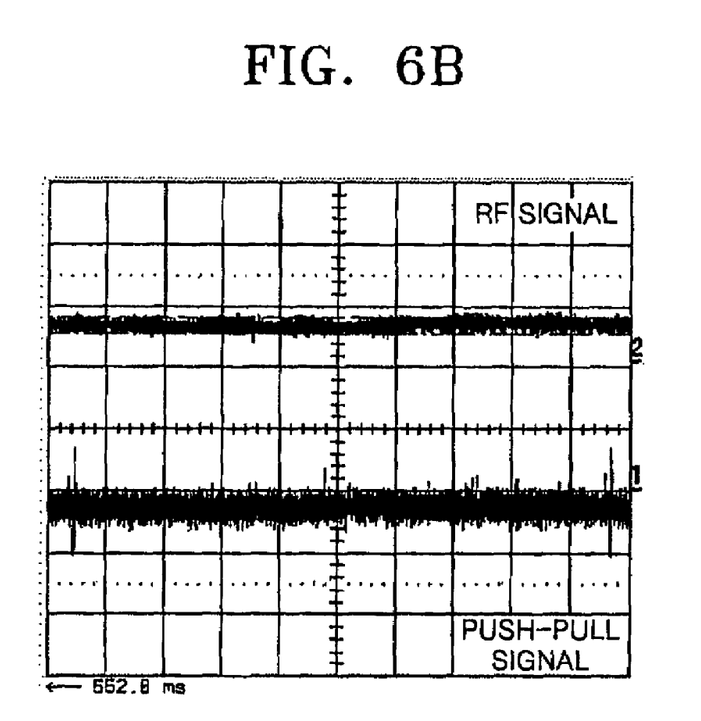
FIG. 6B shows a push-pull signal and a radio frequency (RF) signal, both having excellent characteristics.

When a single pattern is tracked, controlling the tracking using the DPD method is difficult. FIG. 6A shows a DPD signal and a push-pull signal both for a single pattern formed of pits with 2T lengths and spaces with 2T lengths. The graph at the lower part of FIG. 6A shows magnified parts of the DPD signal and push-pull signal. FIG. 6B shows a push-pull signal having excellent characteristics and a radio frequency (RF) signal that is obtained by tracking a single pattern using the push-pull signal. Referring to FIGS. 6A and 6B, the push-pull signal for a single pattern has excellent characteristics. Hence, it is preferable that the push-pull method is used in tracking a single pattern.

Figure 6C:
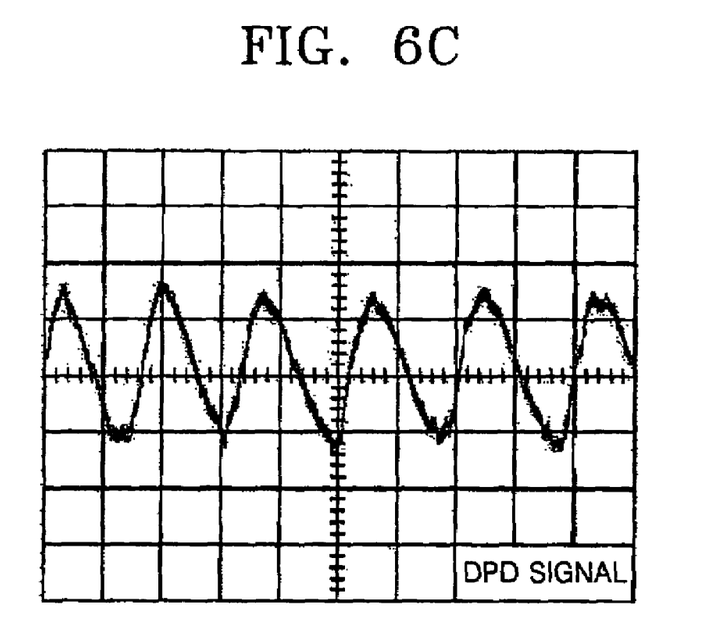
FIG. 6C shows a DPD signal having excellent characteristics.

FIG. 6C shows a DPD signal having excellent characteristics. Compared with FIG. 6C, the DPD signal for a single pattern of FIG. 6A has a distorted triangular waveform, so that normal signal detection is impossible. However, the DPD signal works advantageously on tracking a random pattern.

Accordingly, a test pattern (i.e., a pattern for modulation degree measurement) formed in the test zone 10d can be tracked using a favorable detection method, either the DPD detection method or the push-pull method.

Such tracking using a test pattern creates a signal characteristic graph, for example, an eye pattern. The signal characteristic graph is used in measuring a modulation degree. According to the RLL (1, 7) modulation technique, the pattern for modulation degree measurement is formed of minimum pits of 2T and maximum pits of 8T. $I_{2T}$ is measured from a signal corresponding to the minimum pit of 2T, and $I_{8T}$ is measured from a signal corresponding to the maximum pit of 8T. At this time, only the signal for the pattern for modulation degree measurement can be detected, so that detection of a signal of each of maximum and minimum pits is easy because of less influence of other signals.

In particular, as the recording capacity of information storage media increases, detection of a minimum pit becomes more difficult. However, in the present embodiment of the present invention, a simple pattern including a minimum pit and a maximum pit is used as a pattern for modulation degree measurement, so that a modulation degree can be easily measured. As the size of a minimum pit deceases, cross-talk may occur between adjacent minimum pits. However, the pattern for modulation degree measurement according to the present invention includes regularly-arranged minimum pits, so that cross-talk occurs regularly. Thus, a modulation degree can be measured while taking the regular occurrence of cross-talk into consideration. If a random pattern is used, cross-talk between adjacent pits occurs randomly, so that modulation degree measurement in consideration of the influence of cross-talk is impossible.

The test pattern for measuring the modulation degree of a read-only information storage medium according to the present embodiment of the present invention includes at least one minimum pit and one maximum pit selected from pits used in the data recording modulation technique and is also formed so that a signal characteristic graph has a DC sum of 0.

Figure 7:
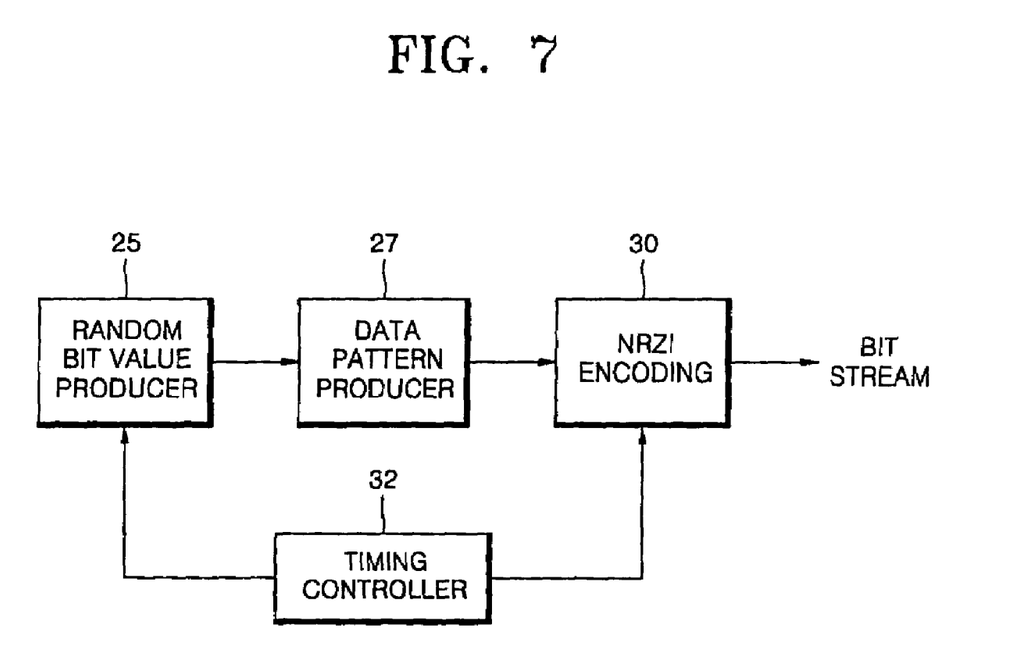
FIG. 7 is a block diagram for illustrating a process of generating a signal for measuring a modulation degree.

According to the RLL (d, k) modulation method, data is recorded in the form of pits and spaces that range in length between (d+1)T and (k+1)T. In the RLL (d, k) modulation method, d denotes a minimum run length, and k denotes a maximum run length. In the production of a signal corresponding to the data, a DC component is removed by selecting two specific run lengths from run lengths in the range of from the minimum run length of d to the maximum run length of k of a modulated code. For example, specific run lengths i and j satisfying d≦i and j≦k are selected. As shown in FIG. 7, in the production of a modulated signal, a random bit value producer 25 produces a random bit value, and a data pattern producer 27 produces first and second data patterns from the random bit value. The first and second data patterns undergo NRZI encoding 30 to produce a bit stream. Reference numeral 32 denotes a timing controller.

The first and second data patterns are a pattern of consecutive (i+1)T pits and a pattern of consecutive (j+1)T pits, respectively, where d≦i and j≦k. A DC component can be removed by setting the overall length of the first and second data patterns to be a 2n (where n is a natural number) multiple of the least common multiple of (i+1) and (j+1).

If i is 1 and j is 7, the first data pattern is a pattern of 2T pits, and the second data pattern is a pattern of 8T pits. The overall length of the first and second data patterns is set to be a 2n multiple of 8T, which is the least common multiple of 2T and 8T. If n is 1, the total length of the first and second data patterns is set to be 16T by repeating the 2T pit eight times to form the first data pattern and repeating the 8T pit two times to form the second data pattern. If n is 2, the total length of the first and second data patterns is set to be 32T by repeating the 2T pit sixteen times to form the first data pattern and repeating the 8T pit four times to form the second data pattern. As described above, the first and second data patterns are formed of repetitive pits that depend on the specific run lengths i and j, respectively, and the total length of the first and second data patterns is set to be an even number multiple of the least common multiple of the first and second data patterns, thereby producing a DC sum of 0.

The first data pattern includes a minimum pit at least and the second data pattern includes a maximum pit at least. In other words, in the RLL (d, k) modulation method, the first data pattern is formed of repetitive (d+1)T pits, and the second data pattern is formed of repetitive (k+1)T pits. The overall length of the first and second data patterns is a 2n (n is a natural number) multiple of the least common multiple of (d+1) and (k+1). If the least common multiple of (d+1)

and (k+1) is indicated by I, (d+1) repeats 2 np times, and (k+1) repeats 2 nq times. Accordingly, p is I/(d+1), and q is I/(k+1). The above-described content is summarized as in Table 4.

|  | Bit value | Repetition number of bit value |
|---|---|---|
| First data pattern | 0 | 2np |
| Second data pattern | 1 | 2nq |

When a signal for measuring a modulation degree is produced by constituting a test pattern using the patterns of Table 4, a DC sum of 0 is obtainable. Thus, a modulation degree can be measured with accuracy.

A PRML adaptation pattern is any of the patterns described above with reference to FIGS. 5A through 5C. Hence, data can be smoothly reproduced from a read-only information storage medium.

As described above, at least one of a pattern for modulation degree measurement, a PRML adaptation pattern, and a pattern for asymmetry measurement is recorded in at least one of a lead-in area and a lead-out area. The use of these patterns enables optimization of data reproduction characteristics.

In a read-only information storage medium according to the present embodiment of the present invention and a method of reproducing data therefrom, at least one of a lead-in area and a lead-out area includes an extra test zone in which a pit pattern necessary for data reproduction is recorded. Thus, the performance of data reproduction is improved.

Also, signal measurement for minimum pits is prevented from becoming difficult due to a reduction of a pit length caused by an increase in the recording capacity. Hence, a modulation degree is measurable with accuracy, thus achieving more reliable data reproduction.

In the data reproduction method according to the present embodiment of the present invention, a test pattern for modulation degree measurement is formed in a test zone, and a reliable modulation degree can be measured using a signal characteristic graph with respect to the test pattern. In addition, the test pattern is formed so that a DC component is removable, enabling a modulation degree to be more accurately measured.

Furthermore, an optimal pattern for PRML adaptation is obtained to easily achieve PRML adaptation. Thus, the performance of data reproduction is improved.

Although an embodiment of the present invention has been shown and described, the present invention is not limited to the disclosed embodiment. Rather, it would be appreciated by those skilled in the art that changes may be made in this embodiment without departing from the principles and spirit of the invention, the scope of which is defined by the claims and their equivalents.

What is claimed is:

1. A read-only information storage medium comprising:
   a data area which stores user data;
   a lead-in area;
   a lead-out area; and
   a test pattern, formed in at least one of the lead-in area and the lead-out area, to measure a modulation degree when data is recorded using a data recording modulation technique,
   wherein the data recording modulation technique is a run length limited (RLL) (d,k) modulation technique, and the test pattern includes at least one pit with a (d+1)T length and one pit with a (k+1)T length and the pits are included in one period.

2. The read-only information storage medium of claim 1, wherein the test pattern includes at least one minimum pit and one maximum pit among pits produced by the data recording modulation technique and the pits are recorded in one period.

3. The read-only information storage medium of claim 2, wherein the test pattern includes a pit with a length different from the lengths of the minimum and maximum pits.

4. The read-only information storage medium of claim 1, wherein the period for the test pattern corresponds to one of an error correction code (ECC) block, a sector, and a frame.

5. The read-only information storage medium of claim 1, wherein the test pattern includes a minimum pit and a maximum pit among pits produced by the data recording modulation technique and the minimum pit and the maximum pit alternate in recording units of the lead-in area and the lead-out area.

6. The read-only information storage medium of claim 1, wherein the test pattern includes first and second patterns which alternate in recording units of the lead-in area and the lead-out area, wherein the first pattern includes minimum pits and pits with lengths different from minimum pits among the pits produced by the data recording modulation technique, and the second pattern includes maximum pits and pits with lengths different from maximum pits among the pits produced by the data recording modulation technique.

7. The read-only information storage medium of claim 6, wherein each recording unit is one of an error correction code (ECC) block, a sector, and a frame.

8. The read-only information storage medium of claim 1, wherein, when the test pattern is reproduced, tracking is performed using one of a differential phase detection (DPD) method and a push-pull method.

9. The read-only information storage medium of claim 1, wherein the test pattern includes at least one pit with a (d+1)T length, one pit with a (k+1)T length, and one pit with a length different from the (d+1)T and (k+1)T lengths and the pits are included in one period.

10. The read-only information storage medium of claim 1, wherein one period is one of one and two recording units of the lead-in area and the lead-out area.

11. The read-only information storage medium of claim 10, wherein each recording unit is one of an error correction code (ECC) block, a sector, and a frame.

12. The read-only information storage medium of claim 1, wherein the test pattern yields a DC sum of a signal characteristic graph of 0.

13. The read-only information storage medium of claim 1, wherein the test pattern includes a first data pattern of (d+1)T pits and a second data pattern of (k+1)T pits.

14. The read-only information storage medium of claim 13, wherein an overall length of the first and second data patterns is a 2n multiple of a least common multiple of (d+1) and (k+1), wherein n is a natural number.

15. The read-only information storage medium of claim 1, wherein the purpose of the test pattern is data reproduction.

16. The read-only information storage medium of claim 1, wherein the test pattern is a pattern for asymmetry measurement.

17. The read-only information storage medium of claim 1, wherein a test zone is included in at least one of the lead-in area and the lead-out area, and the test pattern is formed in the test zone.

* * * * *